US009594658B2

(12) United States Patent
Araki et al.

(10) Patent No.: US 9,594,658 B2
(45) Date of Patent: Mar. 14, 2017

(54) METHOD FOR DISPLAYING OPERATION STATES OF MODULES INCLUDED IN COMPUTER SYSTEM

(71) Applicant: International Business Machines Corporation, Armonk, NY (US)

(72) Inventors: Hiroshi Araki, Tokyo (JP); Tohru Hasegawa, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 258 days.

(21) Appl. No.: 14/086,394

(22) Filed: Nov. 21, 2013

(65) Prior Publication Data

US 2014/0149899 A1 May 29, 2014

(30) Foreign Application Priority Data

Nov. 27, 2012 (JP) ................................. 2012-258153

(51) Int. Cl.
*G06F 3/048* (2013.01)
*G06F 11/30* (2006.01)
*G06F 11/32* (2006.01)

(52) U.S. Cl.
CPC ...... *G06F 11/3096* (2013.01); *G06F 11/3055* (2013.01); *G06F 11/328* (2013.01); *G06F 11/3031* (2013.01)

(58) Field of Classification Search
CPC ..................................................... G06F 11/34
(Continued)

(56) References Cited

U.S. PATENT DOCUMENTS 6,151,023 A * 11/2000 Chari .................... G06F 9/4411
709/223
7,617,462 B2 * 11/2009 Budzisch ............ H04L 43/0817
715/736
(Continued)

FOREIGN PATENT DOCUMENTS

CN 101297272 A 10/2008
JP 5346869 12/1993
(Continued)

OTHER PUBLICATIONS

Windows Vista: Inside Out Deluxe Edition, Bott et al., May 14, 2008, pp. 196-197.*
(Continued)

*Primary Examiner* — Matthew Ell
(74) *Attorney, Agent, or Firm* — Cantor Colburn LLP

(57) ABSTRACT

A method for obtaining and displaying operation states of a plurality of modules of a system. The operation state of one module that is carrying out a current function is acquired along with the operation states of a module set that is being used by the one module in carrying out its current function, wherein the module set may itself include a plurality of individual modules. Thereby, the latest operation states of the one module and its module set are acquired without inquiring of the operating state of each individual module that makes up the one module and its module set. Thus, the latest operation states of the individual modules included in the system can be displayed without imposing extra loads on the modules, i.e., without imposing extra negative influence on the current function being carried out, and/or on essential operations of the system.

18 Claims, 3 Drawing Sheets

(58) Field of Classification Search
USPC .................................. 715/736, 738; 709/224
See application file for complete search history.

(56) References Cited

U.S. PATENT DOCUMENTS

| | | | | |
|---|---|---|---|---|
| 2006/0150105 A1* | 7/2006 | Bright | ................. | G06F 11/0715 |
| | | | | 715/736 |
| 2007/0100987 A1* | 5/2007 | Aggarwal | ........... | G06F 11/3495 |
| | | | | 709/224 |

FOREIGN PATENT DOCUMENTS

| | | |
|---|---|---|
| JP | 2001057568 | 2/2001 |
| JP | 2001251323 A | 9/2001 |
| JP | 2003015972 | 1/2003 |
| JP | 2007011823 A | 1/2007 |
| JP | 2009514079 A | 4/2009 |
| JP | 2011076239 | 4/2011 |
| WO | 2007004417 A1 | 1/2007 |
| WO | 2007048726 A1 | 5/2007 |
| WO | 2009040876 A1 | 4/2009 |

OTHER PUBLICATIONS

English Translation of JP2001251323A, 11 pages.
English Translation of JP2007011823A, 16 pages.
English Translation of JP2009514079A, 15 pages.
Japanese Search Report for International Application PCT/JP2013/073525; Filing date Nov. 27, 2012. Mailing date Nov. 12, 2013. (2 pgs).
English Translation of WO2009040876A, 35 pages.

* cited by examiner

FIG. 1
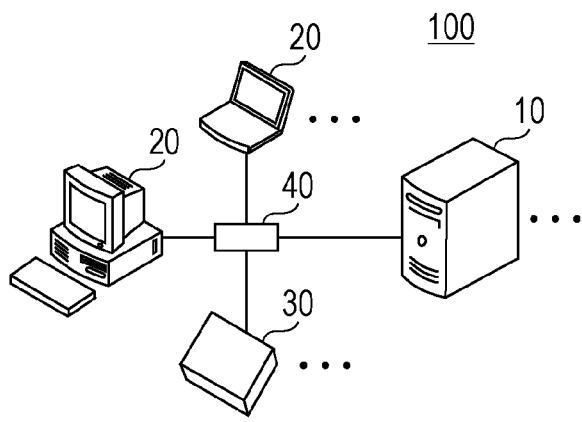
FIG. 2
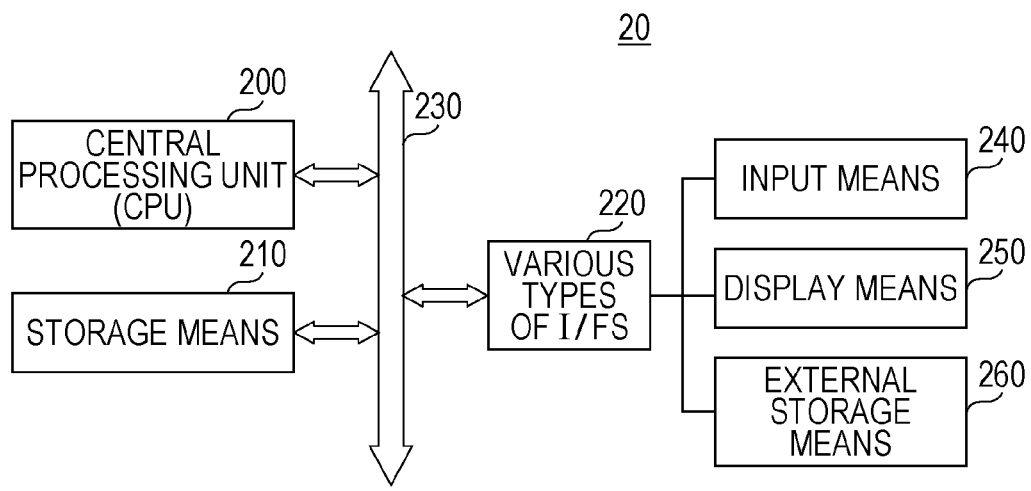
FIG. 3
| MODULE ID (Mi) | 1 | 2 | 3 | ··· | n−1 | n |
|---|---|---|---|---|---|---|
| OPERATION STATE | OK | Warning | Fail | ··· | OK | Fail |

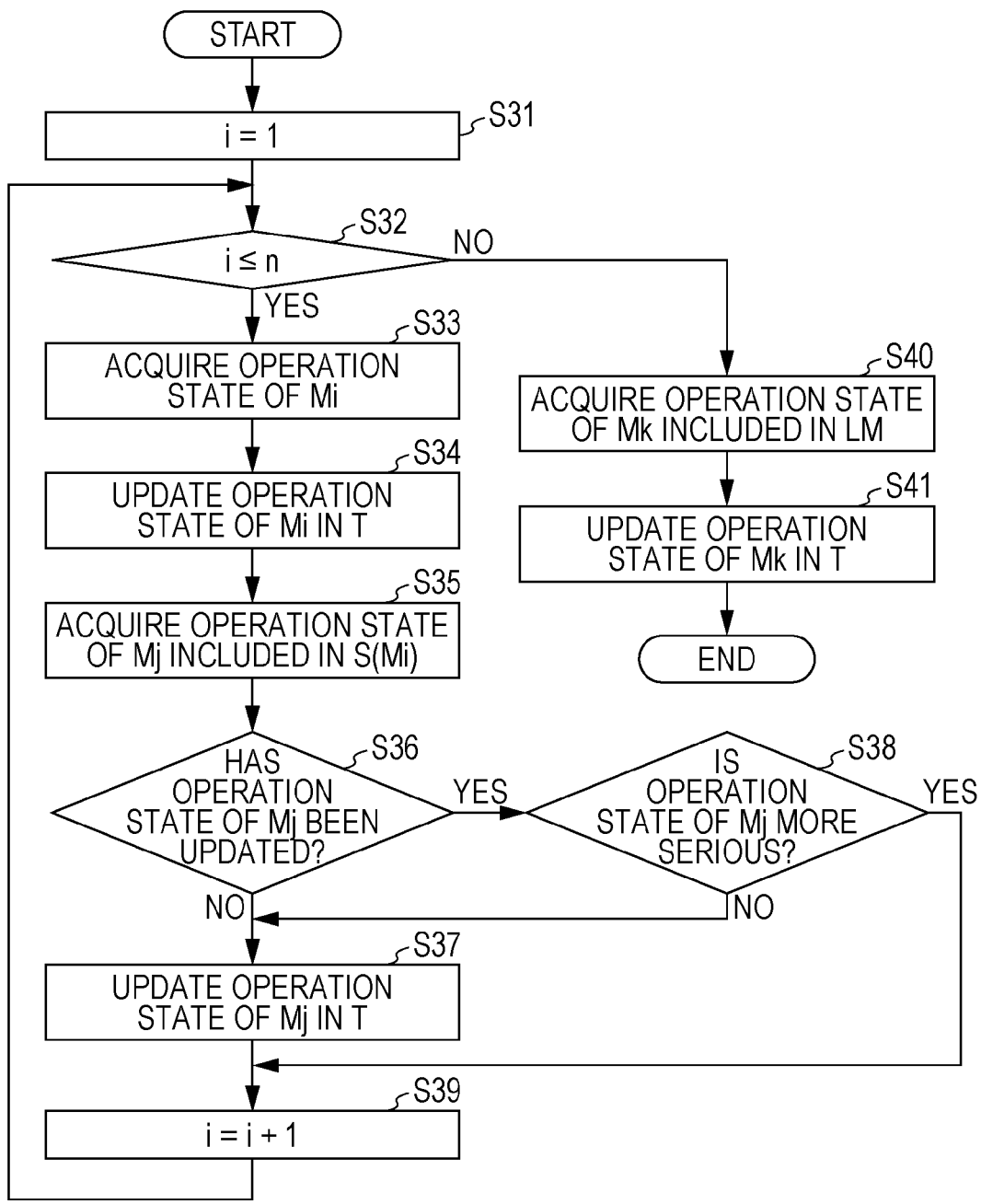

METHOD FOR DISPLAYING OPERATION STATES OF MODULES INCLUDED IN COMPUTER SYSTEM

PRIORITY

This application claims priority to Japan Application Serial No. 2012-258153, filed Nov. 27, 2012, and all the benefits accruing therefrom under 35 U.S.C. §119, the contents of which in its entirety are herein incorporated by reference.

BACKGROUND

The disclosed embodiments relate to a method for displaying the operation states of modules included in a computer system, and more specifically, they relate to a method for, in a system including a computer and a storage device, displaying the operation states of modules which are pieces of dedicated software and modules which are pieces of general-purpose software or hardware.

As the scale of computer systems increases, in some cases, systems are configured by combining a plurality of modules dedicated to the systems and a plurality of general-purpose modules. In such a large-scale system, there is a case where system management is performed from different viewpoints that are a viewpoint of an end user and a viewpoint of a professional engineer. In other words, the end user performs management in such a manner as to focus on whether the system correctly operates as a whole, and the professional engineer performs management in such a manner as to also check, in detail, whether the state of each of the modules is a normal state. Here, it is supposed that the modules are not only hardware (H/W) modules, such as an HDD or an HBA, but also software (S/W) modules, such as processes for causing the system to operate.

In order to realize management from these two viewpoints, in a large-scale system, typically, management tools are separately prepared. In other words, two separate tools, i.e., an end-user-oriented management tool and a professional-engineer-oriented management tool, are present. For example, in one known example in which a virtual tape server (VTS) is used, an end user checks, using a GUI utilizing a Web browser as a management tool, for example, whether an overall system operates. In contrast, a professional engineer checks, using a dedicated tool utilizing a command line as a management tool, for example, whether each module, such as an HDD, malfunctions.

In such a system, an end-user-oriented system management tool inquires about the states of individual modules on an individual basis, and summarizes results of the inquiries, thereby realizing management of the system. In one known example there is a configuration, in which a Web server of a system that is a management target inquires, of individual modules included in the system that is a management target, the states of the modules, in which the Web server acquires results of inquiry, and in which the Web server displays the results as a GUI. The configuration is used in, for example, a management interface of a VTS.

Methods in which the end-user-oriented management tool inquires about and displays the states of individual modules include the following.

(a) In response to a request from a user, the end-user-oriented management tool makes real-time inquiries about the states of the modules, and displays either the states or information concerning the states.

(b) Asynchronously with a request from a user, the end-user-oriented management tool inquires about the states of modules and temporarily stores (caches) either the states or information concerning the states, and the management tool calls and displays the cached information later.

In the method of (a), when inquires about the states of individual modules are successively made, the loads imposed on the modules temporarily increase. Consequently, the load imposed on the system temporarily increases, and there is a problem that this negatively influences an essential operation of the system (for example, an I/O process for inputting/outputting from a host). Furthermore, in the method of (b), because the cached information is updated when an essential operation of the system is not so often performed, the cached information can be updated without influencing the essential operation of the system. However, there is a problem that, when operations of the system are continuously performed, the information is not often updated.

Additional details of known systems are disclosed in Japan Unexamined Patent Application Publication No. 2001-057568 and Japan Unexamined Patent Application Publication No. 2003-015972.

Thus, it would be advantageous to solve/reduce problems in the above-described case where an end-user-oriented management tool is used. More specifically, it would be advantageous to acquire and display, with an end-user-oriented management tool, the latest operation states of individual modules included in a system, without imposing extra negative influence on essential operations of the system.

SUMMARY

The disclosed embodiments provide a method for, in a system including at least one computer and at least one storage device that communicates with the computer, and displays, on display means, operation states of a plurality of first modules and a plurality of second modules. The plurality of first modules may include pieces of dedicated software, and the plurality of second modules may include pieces of general-purpose software or hardware. The method includes: (a) preparing, in the storage device or a memory included in the computer, a table indicating the operation states of the plurality of first modules and the plurality of second modules; (b) acquiring, from a module selected from among the plurality of first modules, the operation state of the module; (c) acquiring, from first modules other than the selected module among the plurality of first modules and/or second modules among the plurality of second modules, the operation states of the individual modules, the first modules and the second modules being modules operating in accordance with an operation of the selected module; (d) updating, by using the acquired operation states of the individual modules, the operation states of the corresponding individual modules in the table; and (e) displaying the operation states of the first modules and the second modules on the display means on the basis of the table after updating.

In the method according to the disclosed embodiments, the operation state of a module that is operating and the operation states of modules that operate in accordance with the operation of the module are acquired without inquiring, of the individual modules, the operation states of the modules, and the operation states of the corresponding modules are updated to the latest states. In other words, the operation state of one module that is carrying out a current function is acquired, along with the operation states of a module set that is being used by the one module in carrying out its current function, wherein the module set may itself include a plurality of individual modules. Thereby, the latest operation states of the one module and its module set are acquired without inquiring of the operating state of each individual module that makes up the one module and its module set. Thus, the latest operation states of the individual modules included in the system can be displayed without imposing extra loads on the modules, i.e., without imposing extra negative influence on the current function being carried out, and/or essential operations of the system.

BRIEF DESCRIPTION OF THE SEVERAL VIEWS OF THE DRAWINGS

FIG. 1 is a block diagram illustrating an example of a configuration of a computer system in which a method according to the disclosed embodiments is implemented.

FIG. 2 is a diagram illustrating an example of a configuration of a computer that performs the method according to the disclosed embodiments.

FIG. 3 is a diagram illustrating an example of a table indicating the operation states of modules that are used in the disclosed embodiments.

FIG. 6 is a diagram illustrating an example of a flow of a process of updating the table in the case where the method according to the disclosed embodiments is implemented.

DETAILED DESCRIPTION

Figure 4:
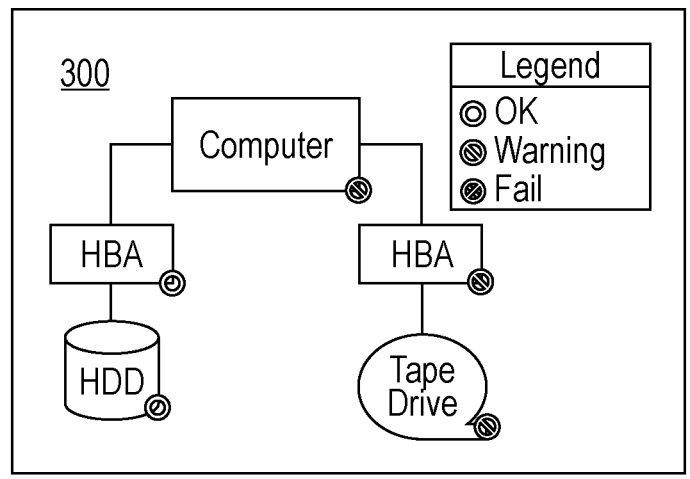
FIG. 4 is a diagram illustrating an example of a GUI displayed in the method according to the disclosed embodiments.

Embodiments of the present disclosure will now be described with reference to the drawings. FIG. 1 is a diagram illustrating an example of a configuration of a computer system in which a method according to the disclosed embodiments is implemented. A system 100 includes a host (server) 10, PCs (terminals) 20, and a network drive 30 that are connected to each other via an Ethernet (registered trademark) switch (LAN switch) 40 so as to be capable of communicating with each other. The network drive 30 includes storage means such as an HDD or a tape drive. Each of these devices can be one of "modules" that are used in the disclosed embodiments. Moreover, each of modules or devices that are associated with the individual devices can also be one of the modules here. Examples of the "modules" include not only pieces of H/W, but also pieces of S/W that are utilized in the system. Furthermore, examples of the "modules" include pieces of S/W that are dedicated to the system, and pieces of general-purpose H/W and S/W. In FIG. 1, one host (server) 10, one network drive 30, and two PCs (terminals) 20 are illustrated. However, these are only examples, and, as a matter of course, regarding each of the devices, any number of devices (one or at least two) can be included.

Regarding the method according to the disclosed embodiments, in the configuration illustrated in FIG. 1, for example, one of the PCs 20 calls software that has been downloaded from the server 10 or the network drive 30 or software that is stored in storage means (an HDD or the like) which is built into the PC 20, and executes the software, whereby the method according to the disclosed embodiments is implemented.

FIG. 2 is a block diagram illustrating an example of a configuration of a computer that performs the method according to the disclosed embodiments. In FIG. 2, an example of a configuration of each of the PCs 20 illustrated in FIG. 1 is illustrated. The PC 20 includes a central processing unit (CPU), storage means 210, and various types of I/Fs 220, which are connected to each other via a bus 230. An input I/F, an output I/F, an external storage I/F, an external communication I/F, and so forth are collectively referred to as the various types of I/Fs 220. Each of the I/Fs is connected to a corresponding one of input means 240, such as a keyboard or mouse, display means 250, such as a CRT or LCD, external storage means 260, such as a semiconductor memory using USB connection or an HDD, and so forth. The storage means 210 can include, for example, a semiconductor memory, such as a RAM or ROM, or an HDD. A GUI, the details of which are described below, is displayed on the display means 250.

Individual terms used in the method according to the disclosed embodiments will now be described. IDs are provided for the individual modules in such a manner that the modules have IDs of 1, 2, 3, 4, . . . , and a module having an ID of i is denoted by Mi. Each of the modules included in the system can be classified as a piece of S/W that has been developed so as to be dedicated to the system in order to process an essential operation of the system, or a piece of general-purpose S/W or H/W that is utilized by such a piece of S/W. Thus, a set of modules that are pieces of S/W developed so as to be dedicated to the system is denoted by MM, which is represented by an expression MM={M1, . . . Mj}. Also, a set of modules that are pieces of general-purpose S/W or H/W is denoted by LM, which is represented by an expression LM={Mj+1, . . . Mn}.

In the disclosed embodiments, for information necessary for an end-user-oriented management tool, a table indicating the operation states of the individual modules is added to the system. The table is stored in the storage means 210 or the like. The table is denoted by T. The states of the individual modules are states in terms of whether a problem has occurred when an essential operation of the system has been performed. An example of the table T is illustrated in FIG. 3. IDs are provided for the individual modules in such a manner that the modules have IDs of 1, 2, 3, 4, . . . n, and a module having an ID of i is denoted by Mi.

In the example illustrated in FIG. 3, as examples of the operation state of each of the modules, three states, i.e., "OK" indicating a normal state, "Fail" indicating an abnormal state of not operating, and "Warning" indicating a warning state representing an intermediate state between the normal state and the abnormal state, are provided. Note that the three states are only examples, and two or at least four states may be provided. Referring to FIG. 3, for example, the module 1 (M1) is in the normal state (OK), and the module 3 (M3) is in the abnormal state (Fail).

In the disclosed embodiments, for each of the modules included in the module set MM, an interface that, in addition to information indicating whether the module operates normally, returns the state of modules which are currently being used by the module is added. For example, in the case where the module M1 included in the module set MM calls the module M2 and where the module M2 operates normally, information indicating that both the module M1 and the module M2 are OK can be acquired. In the case where the module M2 returns an error, information indicating that both the module M1 and the module M2 are in the abnormal state (Fail) can be acquired.

Furthermore, in the case where the module M1 included in the module set MM calls the modules M2 and M3 and where the module M3 returns an error although the module M2 operates normally, information indicating that all of the modules M1, M2, and M3 are in the warning state (Warning) can be acquired. In this case, information indicating that both the module M1 and the module M2 are OK but the module M3 is in the abnormal state (Fail) may be acquired. As described above, the interface in the disclosed embodiments only checks whether, for a module included in the module set MM, modules that are currently being used by the module return errors. Thus, this does not impose any new load on an essential operation of the system.

FIG. 4 is a diagram illustrating an example of a GUI 300 that is displayed in a display screen on the basis of the states included in the table which is illustrated in FIG. 3 as an example. The GUI 300 may be displayed on the basis of the states included in the table T after the table T has been updated by performing a flow of the method according to the disclosed embodiments, which is described below. In FIG. 4, a computer (Computer), a hard disk drive (HDD), a tape drive (Tape Drive), and a host bus adapter (HBA) are individually graphically displayed as blocks that represent icons. Visual effects (graphics such as ⊚) that represent the normal state (OK), the abnormal state (Fail), and the warning state (Warning), which are described above, are added to the individual icons (blocks).

Using GUI 300, an end user can visually and easily grasp the operation states of the individual modules. Note that the module configuration illustrated in FIG. 4 is only an example, and, as a matter of course, any configuration desired by the end user can be displayed. Furthermore, the visual effects representing the individual operation states are also not limited to the graphics such as ⊚, and can be displayed using graphics having other shapes, colors, or a configuration including flashing display or the like. Alternatively, the color of the icon of each of the modules may be changed in accordance with the operation state of the module, or the icon may be displayed so as to flash.

Furthermore, in the disclosed embodiments, in addition to the module sets MM and LM described above, a set of modules that are used at one point in time by the module M1 included in the module set MM is denoted by S(Mi). The module set S(Mi) is a set that dynamically changes in accordance with the operation state of the module M1. For example, where a virtual tape server (VTS) is used, supposing that a process (S/W) which performs hierarchical disk storage management (HSM) is the module M1, an HBA which is used for connection to the module M2 that is an HDD is the module M3, a tape drive is the module M4, and an HBA which is used for connection to the module M4 is the module M5, the module sets MM and LM are represented by the following expressions.

$$MM=\{M1\}$$

$$LM=\{M2,M3,M4,M5\}$$

When the module M1 is performing a process of reading data from the module M2 that is an HDD, because the modules M2 and M3 are being used, the module set S(M1) is represented by the following expression.

$$S(M1)=\{M2,M3\}$$

Furthermore, when the module M1 is performing a process of writing data into the module M4, which is a tape drive, because the modules M4 and M5 are being used, the module set S(M1) is represented by the following expression.

$$S(M1)=\{M4,M5\}$$

Examples of a flow of the method according to the disclosed embodiments and a flow of a process of updating the table T in the case where the method according to the disclosed embodiments is implemented will be described with reference to FIGS. 5 and 6. Regarding the flow of the method and the flow of the process of updating the table T which are illustrated in FIG. 5 and FIG. 6, respectively, the computer (PC 20) illustrated as an example in FIG. 2 performs corresponding software, whereby the flows are implemented.

Figure 5:
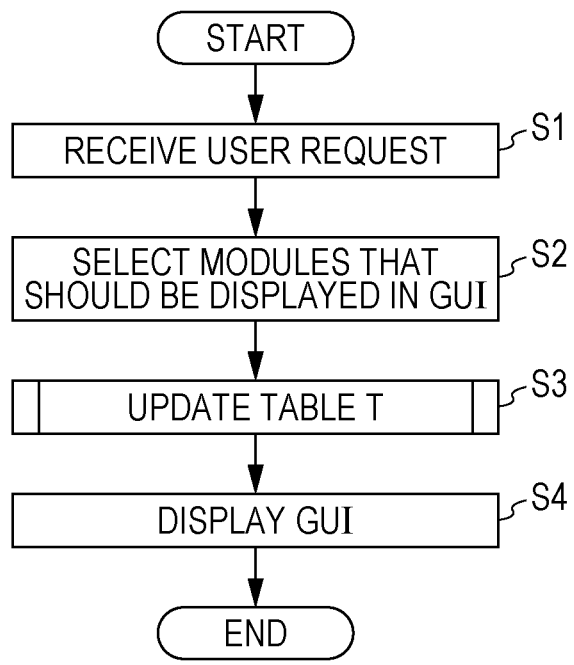
FIG. 5 is a diagram illustrating an example of a flow of the method according to the disclosed embodiments in the case where the method according to the disclosed embodiments is implemented.

With reference now to FIG. 5, in S1, a request to check (acquire) the operation states of the modules is received from the end user. More specifically, for example, a certain command is input by the input means 240 of the PC 20, whereby the request is received. In this case, the end user can select (specify) a module set (MM) of modules whose operation states are desired to be checked at the same time by the end user. In S2, modules whose operation states should be acquired and displayed in a GUI are selected. More specifically, a GUI display screen related to the module set that has been selected by the end user or that has been automatically set is selected (set). For example, a display screen having the configuration of the above-described GUI 300 illustrated in FIG. 4 may be selected.

In S3, the update process of updating the table T illustrated in FIG. 3 is performed. The details of this update process will be described below. In S4, on the basis of the updated table T, the operation states of the individual modules are displayed in the GUI display screen that has been selected in S2. For example, the above-described visual effects in the GUI 300 illustrated in FIG. 4 are displayed. With this GUI display, the end user can visually and quickly grasp the latest operation states of the modules included in the system.

The update process (flow) of updating the table T, which is performed in S3 illustrated in FIG. 5, will now be described with reference to FIG. 6. In FIG. 6, an example of the case where n modules (MM={M1, . . . Mn}) are selected is illustrated. In S31, i of the module M1 is initialized so that an equation i=1 is satisfied. In S32, whether or not i is equal to or smaller than n is determined. When the result of the determination in S32 is YES, in S33, the operation state of the module M1, which is the i-th module in the module set MM, is acquired. More specifically, a signal (information) is received from the above-described interface that returns the operation states of the individual modules which are set in advance. In S34, the table T is updated using the acquired operation state of the module M1.

In S35, the operation state of a module Mj included in the module set S(Mi) of modules that is used (operates) in accordance with the operation of the module M1 is acquired, similarly, via a certain interface as in S33. In S36, whether or not the operation state of the module Mj has already been updated in the table T is determined. When the result of the determination in S36 is NO, i.e., when the operation state of the module Mj has not been updated, in S37, the table T is updated using the acquired operation state of the module Mj.

When the result of determination in S36 is YES, in S38, whether or not the operation state of the module Mj in the table T is more serious than the acquired operation state of the module Mj is determined. More specifically, for example, in the case where the three operation states that are illustrated in FIG. 3 as examples are used, supposing that the degree of seriousness of the operation state increases in the order of the normal state (OK), the warning state (Warning), and the abnormal state (Fail), whether or not the degree of seriousness is higher. For example, in the case where the operation state of the module Mj in the table T is the normal state (OK) and where the acquired operation state of the module Mj is the warning state (Warning), the result of the determination in S38 is NO. In contrast, in the case where the operation state of the module Mj in the table T is the abnormal state (Fail) and where the acquired operation state of the module Mj is the warning state (Warning), the result of the determination in S38 is YES.

When the result of the determination in S38 is NO, i.e., when the degree of seriousness of the acquired operation state of the module Mj is higher, in S37, the table T is updated using the acquired operation state of the module Mj. The reason for this is that it is important to notify the end user of the latest state which is more serious. When the result of the determination in S38 is YES, i.e., when the degree of seriousness of the acquired operation state of the module Mj is not higher, in S39, i of the module M1 is increased so that an equation i=i+1 is satisfied, and the process returns to S32. S32 to S37 are repeated until an equation i=n is satisfied, whereby the operation states of the modules M1 to Mn are updated in the table T. Note that, in the case where the number of modules Mj included in the module set S(Mi) in S35 is at least two (S(Mi)={Mj1, Mj2, . . . Mjm}), S35 to S37 are repeated only multiple number of times m that is the number of modules Mj, whereby the operation states of all of the modules Mj are acquired and updated.

When the result of the determination in S32 is NO, i.e., when i is larger than n, in S40, if there is a module which is included in the module set LM that is a set of pieces of general-purpose S/W or H/W and whose operation state has not been updated in the table T, the module is denoted by Mk, and the operation state of the module Mk is acquired. In this case, a signal for checking the operation state of the module Mk is transmitted to the module Mk, and information concerning the operation state is acquired as a reply to the signal. Then, in S41, the table T is updated using the acquired operation state of the module Mk as in S34. In this case, the module Mk is a module that is not used in an essential operation of the system. Thus, even when the signal is transmitted to the module Mk on an individual basis and the operation state of the module Mk is acquired, the table T can be updated without influencing the essential operation of the system.

The disclosed embodiments have been described with reference to the drawings. However, the scope of this disclosure is not limited to the disclosed embodiments. Without departing from the scope of the present disclosure, the disclosed embodiments may be implemented by making a variety of improvements, corrections, and modifications to the disclosed embodiments on the basis of knowledge that persons skilled in the art have.

The word "example" is used herein to mean "serving as an instance or illustration." Any embodiment described herein as an "example" is not necessarily to be construed as preferred or advantageous over other embodiments. Likewise, the term "embodiments" does not require that all embodiments include the discussed feature, advantage or mode of operation.

The terms "comprises," "comprising," "includes" and/or "including", when used herein, specify the presence of stated features, integers, operations, elements, and/or components, but do not preclude the presence or addition of one or more other features, integers, operations, elements, components, and/or groups thereof.

Further, many embodiments are described in terms of sequences of actions to be performed by, for example, elements of a computing device. It will be recognized that various actions described herein can be performed in a varying sequence, and the particular order of the disclosed actions may be rearranged where appropriate without departing from the scope of the claimed subject matter.

What is claimed is:

1. A computer implemented method comprising:
   acquiring operating states, by a computer, of a plurality of modules, wherein said acquiring operating states of said plurality of modules comprises acquiring an operating state by a computer of a first one of said plurality of modules, wherein said acquiring said operating state of said first one of said plurality of modules is based at least in part on a determination that said first one of said plurality of modules is operating;
   acquiring operating states, by said computer, of a first module set, wherein said acquiring operating states of said first module set is based at least in part on a determination that at least one module of said first module set is being used by said first one of said plurality of modules to carry out a function being performed by said first one of said plurality of modules;
   wherein said acquiring operating states by said computer of said first module set occurs only when said at least one module is being used by said first one of said plurality of modules to carry out said function being performed by said first one of said plurality of modules;
   wherein a latest operating state of said at least one module and said at least one module's first module set is acquired without inquiring of the operating state of each individual module that makes up said at least one module's first module set; and
   displaying a graphical user interface (GUI) comprising computer system operation states comprising said operating state of said first one of said plurality of modules and said operating states of said first module set.

2. The method of claim 1 wherein said first module set dynamically changes based on a change in said function being performed by said first one of said plurality of modules.

3. The method of claim 1 wherein said acquiring said operating state by said computer of said first module set does not impose an extra load on said function being performed by said first one of said plurality of modules.

4. The method of claim 3 wherein:
   said plurality of modules comprise dedicated software; and
   said first module set comprises general purpose software or hardware.

5. The method of claim 1 further comprising:
   acquiring operating states by said computer of a third module set comprising at least one module that is not being used in an operation of said computer system; and
   wherein said computer system operation states further comprise said operating states of said third module set.

6. The method of claim 1 further comprising:
   acquiring an operating state by, said computer, of a second one of said plurality of modules, wherein said acquiring said operating state of said second one of said plurality of modules is based at least in part on a determination that said second one of said plurality of modules is operating;

acquiring operating states by said computer of a second module set, wherein said acquiring operating states of said second module set is based at least in part on a determination that at least one module of said second module set is being used by said second one of said plurality of modules to carry out a function being performed by said second one of said plurality of modules;

wherein said acquiring operating states by said computer of said second module set occurs only when said at least one module is being used by said second one of said plurality of modules to carry out said function being performed by said second one of said plurality of modules; and said computer system operation states further comprising said operating state of said second one of said plurality of modules and said operating states of said second module set.

7. The method of claim 6 further comprising:
storing in a table said operating state of said first one of said plurality of modules, said second one of said plurality of modules, said first module set and said second module set; and
thereby updating said table in response to said acquiring limitations of claim 6.

8. The method of claim 7 further comprising:
determining whether there is overlap between said second module set and said first one of said plurality of modules and said first module set; and
wherein said updating further comprises determining whether a corresponding acquired operating state is different than said operating state of said table.

9. The method of claim 1 wherein said first one of said plurality of modules is selected by a user.

10. The method of claim 1 wherein said first one of said plurality of modules is predetermined.

11. A system for displaying computer system operation states, the system comprising:
a computer system having a processor and a storage device, the computer system configured to perform a method comprising:
acquiring operating states of a plurality of modules, wherein said acquiring operating states of said plurality of modules comprises acquiring an operating state of a first one of a said plurality of modules, wherein said acquiring said operating state of said first one of said plurality of modules is based at least in part on a determination that said first one of said plurality of modules is operating;
acquiring operating states of a first module set, wherein said acquiring operating states of said first module set is based at least in part on a determination that at least one module of said first module set is being used by said first one of said plurality of modules to carry out a function being performed by said first one of said plurality of modules;
wherein said acquiring operating states of said first one of said plurality of modules occurs only when said at least one module is being used by said first one of said plurality of modules to carry out said function being performed by said first one of said plurality of modules;
wherein a latest operating state of said at least one module and said at least one module's first module set is acquired without inquiring of the operating state of each individual module that makes up said at least one module's first module set; and
displaying a graphical user interface (GUI) comprising the computer system operation states comprising said operating state of said first one of said plurality of modules and said operating states of said first module set.

12. The system of claim 11 wherein said first module set dynamically changes based on a change in said function being performed by said first one of said plurality of modules.

13. The system of claim 11 wherein said acquiring said operating states of said first module set does not impose an extra load on said function being performed by said first one of said plurality of modules.

14. The system of claim 13 wherein:
said plurality of modules comprise dedicated software; and
said first module set comprises general purpose software or hardware.

15. The system of claim 11 further comprising:
acquiring operating states of a third module set comprising at least one module that is not being used in an operation of said computer system; and
wherein said computer system operation states further comprise said operating states of said third module.

16. The system of claim 11 further comprising:
acquiring an operating state of a second one of said plurality of modules, wherein said acquiring said operating state of said second one of said plurality of modules is based at least in part on a determination that said second one of said plurality of modules is operating;
acquiring operating states by said computer of a second module set, wherein said acquiring operating states of said second module set is based at least in part on a determination that at least one module of said second module set is being used by said second one of said plurality of modules to carry out a function being performed by said second one of said plurality of modules;
wherein said acquiring operating states of said second module set occurs only when said at least one module is being used by said second one of said plurality of modules to carry out said function being performed by said second one of said plurality of modules; and
said computer system operation states further comprising said operating state of said second one of said plurality of modules and said operating states of said second module set.

17. The system of claim 16 further comprising:
storing in a table said operating state of said first one of said plurality of modules, said second one of said plurality of modules, said first module set and said second module set; and
updating said table in response to said acquiring limitations of claim 16.

18. The system of claim 17 further comprising:
determining whether there is overlap between said second module set and said first one of said plurality of modules and said first module set; and
wherein said updating said table further comprises determining whether a corresponding acquired operating state is different than said operating state of said table.

* * * * *